Oct. 13, 1959 J. A. VARNEY 2,908,192

DIVIDING HEAD

Filed Dec. 1, 1958 3 Sheets-Sheet 1

INVENTOR.
Justin A. Varney

By [signature]
Attorney.

Oct. 13, 1959

J. A. VARNEY

DIVIDING HEAD 2,908,192

Filed Dec. 1, 1958

3 Sheets-Sheet 2

INVENTOR:
Justin A. Varney

By Jas. M. Roberts
Attorney

Oct. 13, 1959 J. A. VARNEY 2,908,192

DIVIDING HEAD

Filed Dec. 1, 1958 3 Sheets-Sheet 3

INVENTOR.
Justin A. Varney

By [signature]
Attorney.

United States Patent Office 2,908,192

Patented Oct. 13, 1959

2,908,192

DIVIDING HEAD

Justin A. Varney, Los Angeles, Calif.

Application December 1, 1958, Serial No. 777,398

18 Claims. (Cl. 74—813)

This invention relates to a device for dividing a circle or a segment thereof into a selected number of equal parts. While the invention is widely applicable for its purpose, it has special utility as an accessory or attachment known as a dividing head for use on machine tools such as milling machines. Such a dividing head may be used to index a workpiece in terms of fractional parts of a circle or segment thereof and to index angular offsets in any desired units of angular measurements. This particular practice of the invention has been selected by way of example for the present disclosure and will provide adequate guidance for those skilled in the art who may have occasion to apply the same principles to other specific purposes.

The broad object of the invention is to provide a highly accurate dividing head of simple, inexpensive construction that requires no special skill or concentration by the operator and requires no reference to auxiliary tables of any kind. Such a device eliminates errors that are commonly caused by the complexity of an indexing procedure.

One object of the invention is to avoid cumulative errors that are inherently possible in some indexing procedures. Another object to eliminate error carry-over, i.e. to avoid an indexing procedure which makes it possible for an undetected error to be carried forward with each successive indexing step and to be brought to light only upon completion of the whole indexing operation.

Broadly described, the invention achieves these objects by employing a well known geometrical procedure for dividing a given line of a given length into any selected number of equal parts. For the purpose of explanation, this given line may be termed the base line. In accord with well known principles taught in geometry, a second line of indeterminate length is drawn at an acute angle to the given base line extending from one end of the base line and the selected number of any suitable units of linear measurement are marked off on the second line for example, by means of dividers. A third line is then drawn from the outermost unit mark on the second line to the second end of the base line.

These three lines complete what may be termed a measuring triangle. Finally, lines parallel with the third line are drawn from the remaining unit marks on the second line to intersect the base line, the points of intersection being the desired dividing points on the base line. Since the marks on the second line form a scale, the second line may be termed the scale side of the measuring triangle. The third line may be aptly termed the index side of the measuring triangle and the successive lines parallel thereto may be termed index lines.

To apply this geometrical principle to a dividing head for turning a rotary member or work-piece holder to positions corresponding to a selected number of equal parts of a circle or a segment thereof, a measuring triangle is simulated by two intersecting arms which extend towards each other from corresponding base points, the base points defining the base side of the measuring triangle. One of the two arms is a scale arm representing the scale side of the measuring triangle and has a scale of equally spaced graduations extending longitudinally thereof from the corresponding base point; the other arm is an index arm or parallelling arm representing the index side of the measuring triangle and has a longitudinal index aligned with its base point. One of the two arms, preferably the index arm, is guided for movement to carry the corresponding base point along the length of the base side of the measuring triangle with the arm at a constant angle to the base and this arm is operatively connected to the rotary member for movement synchronously therewith.

The procedure for ascertaining the rotary positions of the rotary member corresponding to a selected number of equal parts of a circle is first to position the movable arm at a starting position at the maximum or limit spacing of the two base points, then to adjust at least one of the two arms to cause the index on the index arm to register with a graduation on the scale arm that is the selected number of graduations away from the base point on the scale arm. The mechanism that operatively connects the movable arm with the rotary member is then actuated to shift the index to the successive graduations towards the base point of the scale. Operation of the mechanism to place the index at each of the graduations of the selected series of graduations in sequence places the rotary member in sequence at corresponding positions representing corresponding divisions of a circle. As will be explained, a similar procedure may be followed to divide a selected segment of a circle into any desired number of equal parts.

The various features, objects and advantages of the invention may be understood from the following detailed description together with the accompanying drawings.

In the drawings, which are to be regarded as merely illustrative:

Figure 3:
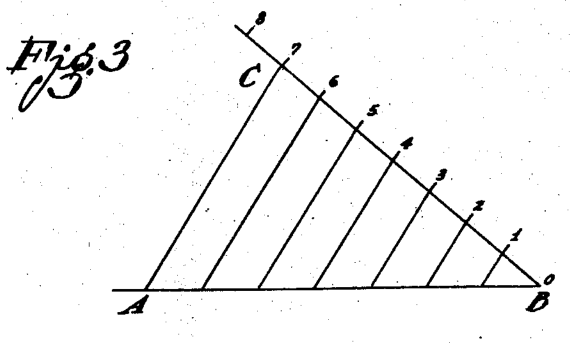
Fig. 3 is a diagram illustrating the geometrical principle involved.

Fig. 3 shows a starting triangle ABC in which AB is the base line that is to be divided into a selected number of equal parts. In this instance the selected number is seven. BC is the scale line on which seven units of measurement are marked: AC is the third index side which determines the direction of the successive parallel lines that divide the base line AB into seven parts.

In the embodiment of the invention selected for the present disclosure, the rotary member that is to be indexed is a spindle 10 on which workpieces may be mounted in a well known manner. The spindle 10 is mounted by suitable bearings 12 in a housing 14 and may be immobilized at any desired rotary position by a well known type of clamp, generally designated 15. The clamp 15 is in the form of a split ring having two terminal ears 16 on opposite sides of a radial block 18 that is fixedly supported by the housing 14. A screw member 20 having an integral radial handle 22 extends through the two ears 16 and the block 18 in a well known manner whereby swinging the handle 22 approximately 90 degrees tightens or loosens the clamp.

A measuring triangle for carrying out the previously described procedure is defined by a scale arm 24 and an index arm 25. The scale arm 24 has a suitable scale 26 thereon divided into equal parts and the zero point of this scale is the corresponding base point of the measuring triangle. The index arm 25 has an index line 28 thereon which is in longitudinal alignment with a second base point 30. The base point at the zero end of the scale 26 and the base point 30 on the index arm 25 define the base side of the measuring triangle, which base side is indicated by the broken line 32 in Fig. 1.

As heretofore stated, either the scale arm or the index arm may be movable in a manner to cause the corresponding base point to traverse the base side of the measuring triangle. In the present embodiment of the invention, the index arm 25 is a traveling arm and for this purpose is mounted by a pivot means 34 on an upright wing 35 of a traveling nut 36. The traveling nut 36 is of a well known split construction and is mounted on a screw thread 38 of an operating shaft 40 with the traveling nut riding in a guideway provided by a suitable guide means 41. The operating shaft 40 is adapted for manual rotation by a suitable crank 42 having a handle 43. The operating shaft 40 may be mounted in three bearing blocks 44, 45 and 46, respectively.

The pivot means 34 is coaxial with the base point 30 and the wing 35 of the traveling nut has an arcuate slot 48 that is concentric to this base point. A pair of screws 50 carried by the index arm 25 extends through the arcuate slot 48 and may be temporarily loosened whenever it is desired to change the angular postion of the index arm. The pair of screws 50 are mounted in countersunk bores in the index arm 25 to be flush with the face of the index arm and thereby permit the index arm to be positioned such that its face carrying index line 28 is in sliding contact with the back face of the scale arm 24.

Figure 1:
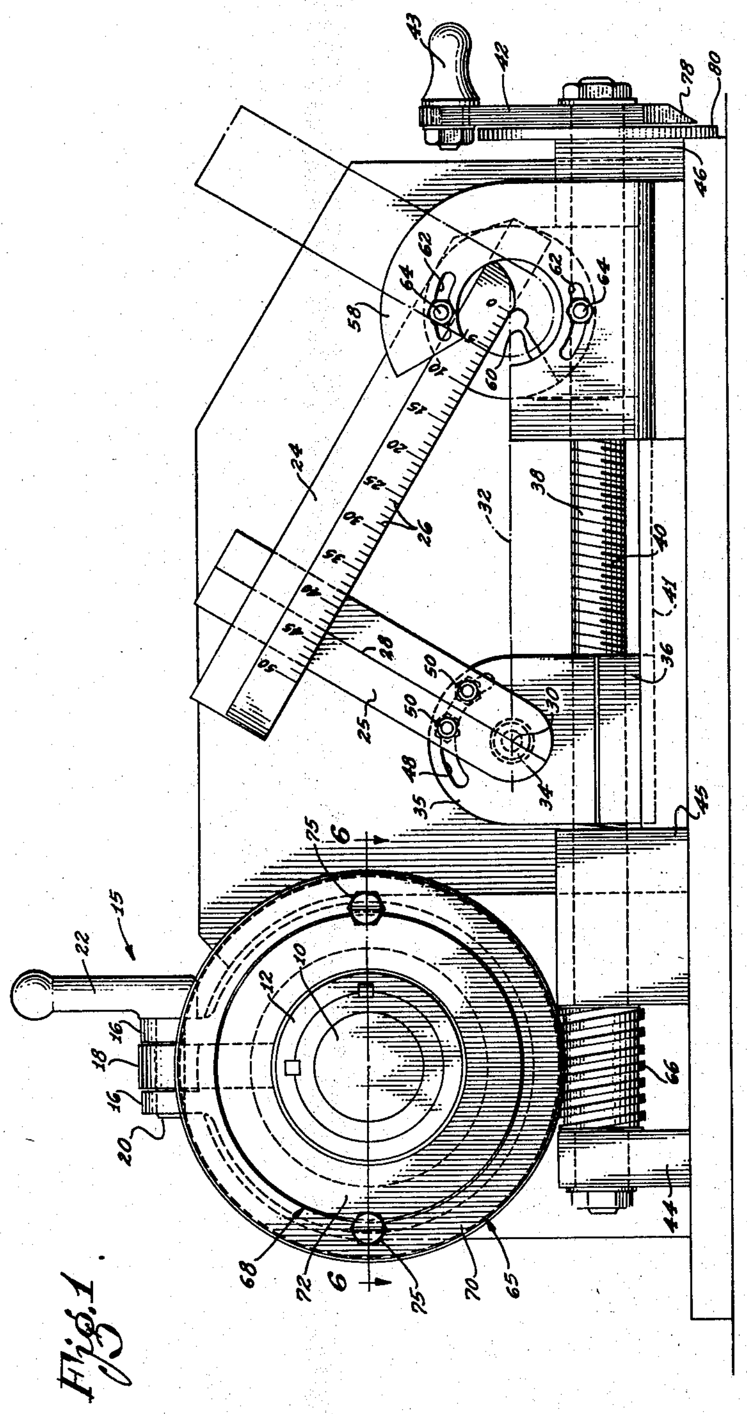
Fig. 1 is a side elevational view of a selected embodiment of the invention showing the two arms adjusted relative to each other to define a starting triangle for use in dividing a circle into forty-three equal parts.
Figure 4:
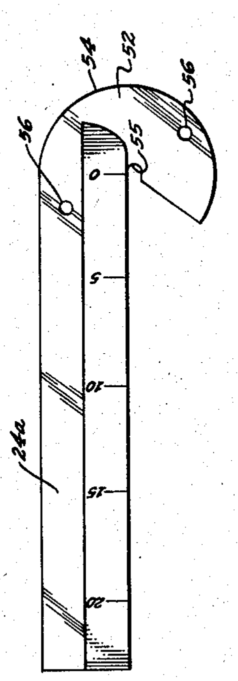
Fig. 4 is a face view of a scale arm with a different scale thereon that may be substituted for the scale arm in Fig. 1.

The scale arm 24 is suitably mounted in a plane slightly offset from the plane of the index arm 25 to permit the index arm to move the full length of the base line 32 to a position at which the two base points coincide, i.e. a position in which the base point 30 of the index arm coincides with the zero point on the scale 26 of the scale arm 24. In the present construction, the scale arm 24 is of a configuration which is shown in Fig. 4. In Fig. 4, a scale arm **24*a* has a flat base portion 52 with an arcuate edge 54 and with a recess 55 in the region of the zero point of its scale. The purpose of the recess 55 is to expose the index line 28 of the index arm 25 when the index line is in the region of the zero point of the scale. The base portion 52 has a pair of diametrically opposite screw holes 56 to accept locking screws 64** as shown in Fig. 1.

The scale arm 24 is removably mounted on a bracket 58 which is formed with a radial recess 60 to expose the zero end of the scale 26 on the scale arm. The bracket is provided with a pair of arcuate slots 62 concentrically of the zero point of the scale to receive a pair of screws by means of which the scale arm 24 is mounted and locked in position on the bracket. Locking screws 64 may be temporarily loosened when required for angular adjustment of the scale arm 24. The screw holes 56 through which locking screws 64 extend are counterbored to permit the screws to be flush with the face of the scale arm 24 thereby to permit the scale arm and the index arm to lie in closely adjacent planes as may be seen in Fig. 2.

In this particular embodiment of the invention, it is contemplated that one revolution of the operating shaft 40 by the crank 42 will rotate the spindle 10 ten degrees so that thirty-six revolutions of the operating shaft will cause the spindle to make one complete revolution. For operatively connecting the spindle 10 with the shaft 40 to carry out this concept, the spindle 10 may carry a worm gear, generally designated 65, in mesh with a worm 66 that is integral with the operating shaft.

Figure 6:
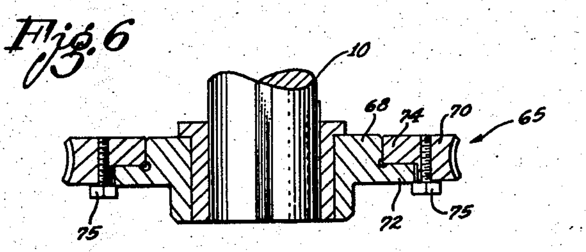
Fig. 6 is a section taken along the line 6—6 of Fig. 1 to show the construction of an adjustment incorporated in the gearing to permit a workpiece to be rotated to any desired starting position.

It is contemplated that the spindle 10 will be rotatably adjustable relative to the worm gear 65 to make it possible to place a workpiece at any desired rotary position for any given position of the index arm 25. For this purpose the worm gear 65 is made in two sections 68 and 70, as best shown in Fig. 6. The inner section 68 which is keyed to the spindle 10 has an outer circumferential flange 72 which overlaps an inner circumferential flange 74 of the outer section 70. The outer section 70 carries a pair of diametrically opposite screws 75 that are normally tightened against the flange 72 to unify the two sections. The screws 75 are temporarily loosened whenever rotary adjustment of the spindle 10 is required.

Figure 2:
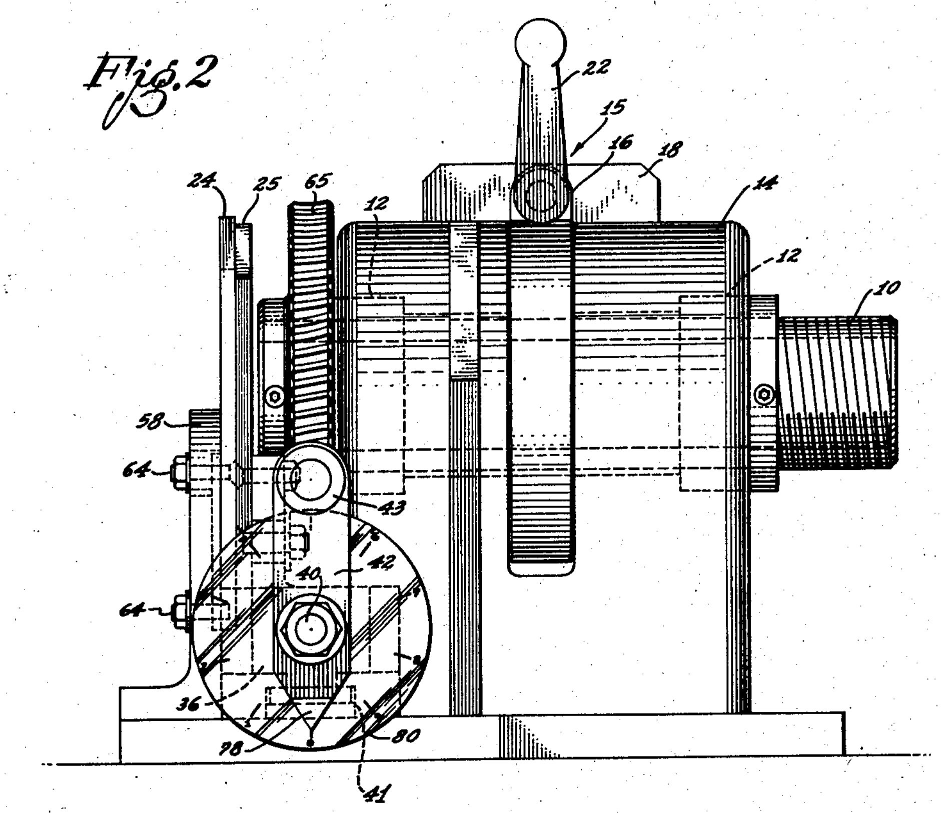
Fig. 2 is an end elevation of the same embodiment.

Since one rotation of the operating shaft 40 represents 10 degrees of rotation of the spindle 10, a suitable scale may be associated with the operating shaft for indicating degrees of rotation of the spindle. For this purpose the operating crank 42 may form a pointer 78 adjacent a fixed disk 80, which disk, as shown in Fig. 2, has a circular scale of ten units, each unit representing one degree of rotation of the spindle.

For forming a measuring triangle to divide a complete circle into a selected number of equal parts the traveling nut 36 is placed at the limit position shown in Fig. 1 at which the traveling nut abuts the bearing block 45, the bearing block serving as a stop at a point defined precisely by movement of traveling nut 36 attendant to 36 revolutions of the lead screw 38 commencing with the zero point of scale 26. Thirty-six revolutions of the operating shaft 40 by the crank 42 would therefore carry the traveling nut 36 from this limit position determined by the stop back to a position at which the two base points would coincide with the index line 28 at the zero point on the scale 26. With the traveling nut 36 at the starting position the index arm 25 is adjusted to place the index line 28 at the desired graduation on the scale 26. It may be desirable also to adjust the angle of the scale arm 24 at this time since it is desirable to have the scale 26 positioned approximately perpendicular to the index line 28, for accuracy and ease of noting coincidence of index line 28 with the scale arm graduations. If the workpiece should have some particular starting orientation, the two screws 75 are temporarily loosened at this time to permit the required rotary adjustment of the spindle 10.

In Fig. 1 it is assumed that the circle is to be divided into 43 equal parts and accordingly the measuring triangle is formed by adjusting the two arms 24 and 25 to place the index mark 28 at the graduation 43 on the scale 26. Since the index arm is held at a fixed angle relative to the base line 32, rotating the crank 42 to shift the traveling nut 36 causes the index line 28 to move through a series of parallel positions. Since the length of the base line 32 corresponds precisely to one rotation of the spindle 10, positioning the index mark 28 at the successive graduations on the scale 26 rotates the spindle 10 to rotary positions at corresponding subdivisions of one complete revolution of the spindle.

It is contemplated that a number of additional scale arms will be provided for interchangeable use. Fig. 4 shows such an additional scale arm **24*a***. To divide a circle into a given number of parts, it is desirable to select a scale arm with a scale thereon such that the starting triangle will fall within the outer 40 percent of the scale arm.

The same general procedure may be used to subdivide any selected segment of a circle. For example if the segment is $\frac{30}{43}$ of a circle and this segment is to be divided into 25 equal parts, the segment may be found by adjusting the two arms for the measuring triangle described above and cranking the operating shaft to shift the index mark 28 to graduation number 30 on the scale arm. Then a new measuring triangle is formed by swinging the index arm about its pivot to place the index mark 28 at graduation number 25 on the scale arm. At this point the screws 75 may be temporarily loosened to permit the workpiece to be turned to a desired starting position. Using this new measuring triangle, positioning of the index mark 28 at the successive remaining graduations on the scale rotates the workpiece to rotary positions at corresponding subdivisions of the selected segment of a circle.

Figure 5:
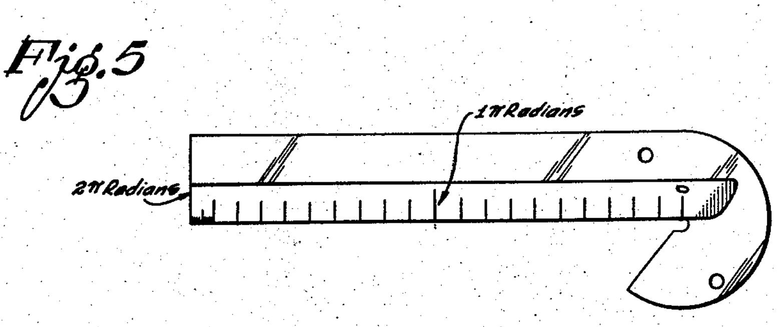
Fig. 5 is a face view of a scale arm calibrated in radians.

In some instances it is desirable to index a workpiece in terms of radians. For this purpose a scale arm shown in Fig. 5 may be provided with each radian divided into 100 parts.

Figures 7, 8:
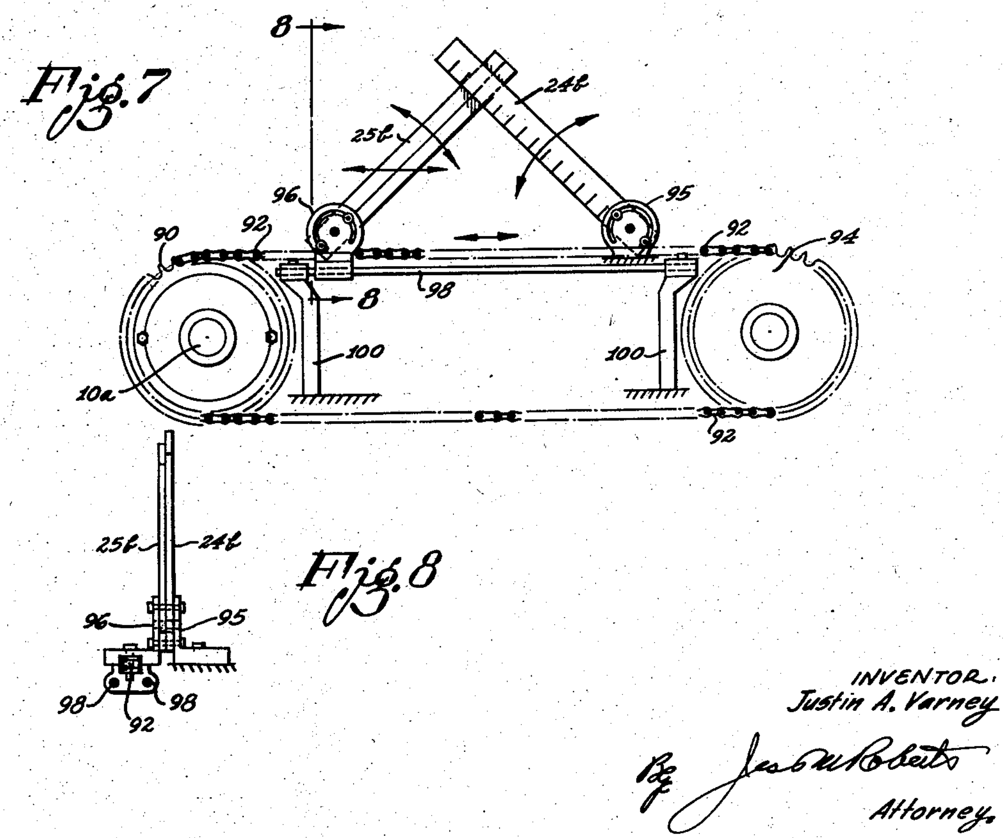
Fig. 7 is a simplified side elevational view of a modified form of the invention.
Fig. 8 is a section on line 8—8 of Fig. 7.

Figs. 7 and 8 show how a sprocket chain transmission may be substituted for the lead screw and traveling nut described above. A sprocket wheel 90 of the same adjustable construction as the worm gear 65 is mounted on a spindle **10*a* and is connected by a sprocket chain 92 with a second idler sprocket wheel 94. A scale arm 24*b* of the character heretofore described is adjustably and removably mounted on a fixed bracket 95 adjacent the upper run of the sprocket chain 92. An index arm 25*b* in sliding contact with the scale arm 24*b* is pivotally mounted on a bracket 96 carried by the upper run of the sprocket chain 92. The bracket 96 slidingly engages a pair of fixed parallel guide rods 98 which hold it in upright position, the guide rods being mounted on fixed supports 100. One revolution of the spindle 10*a* shifts the index arm 25*b*** from the starting position shown in Fig. 7 to the zero position at which the pivot axis of the two arms coincide.

My description in specific detail of the selected embodiment of the invention will suggest various changes, substitutions and other departures from my disclosure within the spirit and scope of the appended claims.

Having described my invention, I claim:

1. Means for rotating a rotary member to positions corresponding to any selected number of equal parts of any given range of rotation of the rotary member, comprising: mechanical means adjustable to form a measuring triangle having a base side defined by two base points, a scale side extending from one of said base points and an index side extending from the other base point, said scale side having a scale with graduations dividing the scale side into equal parts, said mechanical means being operable to change the size of said measuring triangle without change in its angles by shifting one of said two base points relative to the other of the two base points along said base line with corresponding shift of said index side along said scale; and means to operatively connect said mechanical means with said rotary member for operation of the mechanical means synchronously with rotation of the rotary member.

2. Means for ascertaining desired rotary positions of a rotary member corresponding to a selected number of equal parts of a given range of rotation of the rotary member, comprising: a scale arm with a longitudinal scale thereon to represent one side of a measuring triangle, said scale having equally spaced graduations beginning at a first base point on the arm; an index arm to represent a second side of the measuring triangle having a longitudinal index positioned at an angle to said scale arm to intersect said scale at said selected number of graduations from the beginning of the scale, said index being aligned with a second base point on the index arm, said two base points defining the third base side of the measuring triangle; means to guide one of said arms linearly relative to the other to shift the corresponding base point of the arm along said base line with corresponding shift of said index along said scale; and means to operatively connect said one arm with said rotary member to shift the corresponding base point along the length of said base side of the measuring triangle synchronously with rotation of said rotary member through said given range, whereby rotation of the rotary member to place said index at graduations on said scale places the rotary member at the corresponding desired rotary positions.

3. A combination as set forth in claim 2 in which at least one of said arms is rotatably adjustable about its base point to vary the position of said index relative to said scale in accord with different selected numbers.

4. A combination as set forth in claim 3 in which said index arm is adjustable about its base point.

5. A combination as set forth in claim 3 in which both of said arms are adjustable about their respective base points.

6. A combination as set forth in claim 2 in which said scale arm is removably mounted whereby a series of scale arms with different scales may be used interchangeably.

7. Means for ascertaining desired rotary positions of a rotary member corresponding to a selected number of equal parts of a given range of rotation of the rotary member, comprising: a first fixed support; a second support in the form of a traveling means; a scale arm mounted by one end on one of said two supports, said arm having a scale of equal graduations longitudinally thereof to represent a side of a measuring triangle, said scale beginning at a first base point at the supported end of the arm; an index arm mounted by one end on the other of said two supports at an angle to said scale arm and having a longitudinal index to intersect said scale at a selected graduation thereof to represent a second side of the measuring triangle, said index being aligned with a second base point at the supported end of the index arm, said two base points of the two arms representing the third base side of the measuring triangle; driving means parallel to said base side of the measuring triangle carrying said traveling means for shifting the corresponding base point towards and away from the other base point, said driving means being operatively connected to said rotary member for rotation of the rotary member through said given range in synchronism with shift of said corresponding base point over the length of said base side of the triangle.

8. A combination as set forth in claim 7 in which said traveling means is a nut and said driving means is a screw.

9. A combination as set forth in claim 8 in which said screw is connected to said rotary member by gearing to turn the rotary member a whole number of degrees in response to one complete rotation of the screw; and which includes means operatively connected to said screw to indicate the rotary positions of the screw corresponding to said degrees.

10. A combination as set forth in claim 9 in which said indicating means comprises a fixed circular scale and a rotary index operatively connected with the screw.

11. A combination as set forth in claim 8 in which said screw has a pitch to require thirty-six revolutions of the screw to cause one rotation of the rotary member whereby one rotation of the screw turns said rotary member 10 degrees.

12. A combination as set forth in claim 8 in which said screw is operatively connected to said rotary member by a worm and a worm gear, said worm being united with said screw coaxially thereof and said worm gear being connected to said rotary member coaxially thereof.

13. A combination as set forth in claim 7 in which at least one of said arms is rotatably adjustable about the corresponding base point.

14. A combination as set forth in claim 13 in which both of said arms are rotatably adjustable about their corresponding base points.

15. A combination as set forth in claim 7 in which said scale arm is removably mounted on its support whereby a series of scale arms with different scales may be used interchangeably.

16. A combination as set forth in claim 7 in which said traveling means is a fitting attached to said driving means, said driving means comprising an endless transmission means engaging two rotary means.

17. A combination as set forth in claim 16 in which said transmission means is a sprocket chain.

18. A combination as set forth in claim 16 which includes linear guide means for said fitting.

No references cited.